Dec. 26, 1950     E. L. RICHARDSON     2,535,696

ELECTROSTATIC PRECIPITATOR

Filed June 28, 1947

INVENTOR
EARL L. RICHARDSON
BY Robert J. Palmer
Attorney

Patented Dec. 26, 1950

2,535,696

UNITED STATES PATENT OFFICE 2,535,696

ELECTROSTATIC PRECIPITATOR

Earl L. Richardson, Hyde Park, Mass., assignor to Westinghouse Electric Corporation, East Pittsburgh, Pa., a corporation of Pennsylvania Application June 28, 1947, Serial No. 757,785

9 Claims. (Cl. 183—7)

This invention relates to electrostatic precipitators for the removal of dust and other foreign particles from air and other gases.

A successful type of electrostatic precipitator for cleaning air is disclosed in the G. W. Penney Patent No. 2,129,783 which issued Sept. 13, 1938. In such precipitators the air to be cleaned is moved first between ionizer electrodes which act to ionize the air whereby the foreign particles entrained in the air are given electrostatic charges, the air then being moved into a collector chamber in which the charged foreign particles are deposited upon collector electrodes. It is desirable for servicing and replacements to be able to easily remove and replace the collector electrodes.

A feature of this invention is that the collector electrode plates of an electrostatic precipitator are arranged in a relatively small, self-supported cell which can easily be handled and which can be stacked upon another similar cell, and/or placed alongside another similar cell to form any desired size of collector chamber. In a preferred embodiment of the invention, the end plates of the cells which extend parallel to the collector plates and which support same, are rectangular, structural supports having flanged sides which extend outwardly perpendicular to the end plates, the planes of two opposite flanged sides of each plate extending perpendicular to the planes of the other two flanged sides thereof. With horizontally placed cells, the lowermost cell would be supported from the casing of the unit by the contact of the lower flanged sides of its end plates with the lower wall of the casing, and the upper flanged sides of its end plates would receive the lower flanged sides of an upper cell for supporting same. The vertical flanged sides of the end plates would, by contacting spacing members which might be the adjacent vertical flanged sides of the end plates of an adjacent cell, position each cell horizontally in a precipitator.

Another feature of the invention is that the insulators for supporting the charged collector plates from the end plates, are located within the space bounded by the flanged sides of the end plates, outside the stream of gas to be cleaned.

An object of the invention is to reduce the size of the collector cells of an electrostatic precipitator.

Another object of the invention is to increase the ease of installing and removing the collector cells of an electrostatic precipitator.

Another object of the invention is to provide collector cells adapted to be stacked in height and in depth to provide a wide range of sizes of collector chambers for electrostatic precipitators.

Another object of the invention is to remove the insulators supporting the charged collector plates of a collector cell of an electrostatic precipitator, from the stream of gas to be cleaned.

The invention will now be described with reference to the drawing, of which:

Figure 1:
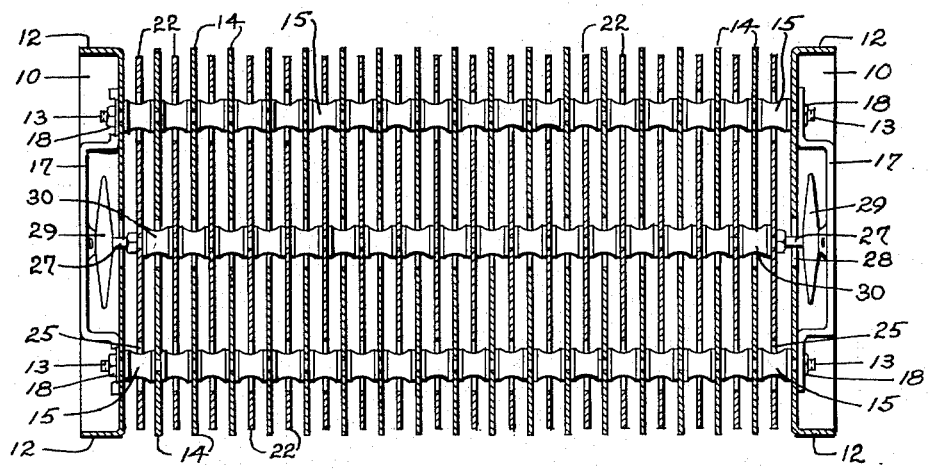
Fig. 1 is a side elevation, with collector and end plates in section, of a collector cell embodying this invention.
Figure 2:
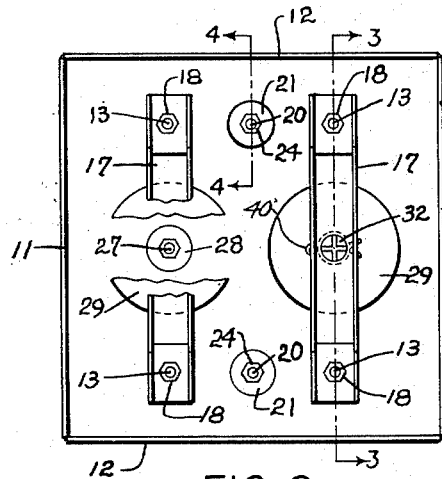
Fig. 2 is an end view, with a portion of one of the insulators removed, of the cell of Fig. 1.
Figure 3:
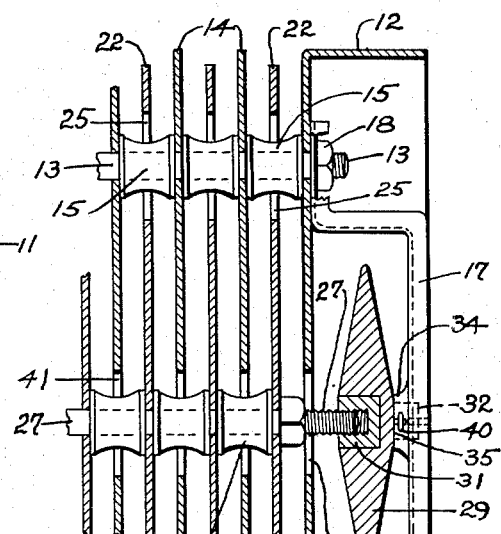
Fig. 3 is an enlarged, fractional view, in section, of the cell, the section being taken along the lines 3—3 of Fig. 2.

The end plates 10 of the cell illustrated, have the two vertical, flanged sides 11, and the two, horizontal, flanged sides 12 extending outwardly therefrom and perpendicular thereto.

The four, metal rods 13 extend through and between the end plates 10 and serve to support the grounded collector plates 14 which are spaced apart by the metal spacers 15. The spacers 15 extend around the rods 13 in close contact therewith, and contact the plates 14 around the apertures therein through which the rods extend, and provide good electrical and mechanical contact between the rods 13 and the plates 14, as well as spacing the plates the correct distances apart.

The ends of the rods 13 extend through apertures in the ends of the metal brackets 17, the nuts 18 being threaded onto the ends of the rods 13, and contacting the brackets 17 and securing same to the end plates 10. The plates 14, the spacers 15, the rods 13, the brackets 17 and the end plates 10 are thus mechanically and electrically connected together, and are adapted to be grounded and connected to the negative side of a suitable, high voltage, direct current, electric source.

The two metal rods 20 extend through the apertures 21 in the end plates 10 and serve to aid in supporting the insulated collector plates 22 which are spaced apart by the metal spacers 23 on the rods 20. The spacers 23 which are similar to the spacers 15, extend around the rods 20 in close contact therewith, and contact the plates 22 around the apertures therein through which the rods 20 extend. The spacers 23 provide good electrical and mechanical contact between the rods 20 and the plates 22, and also serve to space the plates 22 the correct distances apart.

The nuts 24 are threaded onto the ends of the rods 20 against the outer collector plates 22. The apertures 21 in the end plates serve to space the end plates from the rods 20 and the nuts 24 screwed thereon, and to provide openings through which a wrench can be applied for tightening the nuts 24.

The grounded collector plates 14 and the insulated collector plates 22 are alternately arranged. The rods 13 extend through the clearance openings 25 in the collector plates 22, which openings are provided for insulating the rods 13 from the plates 22. The rods 20 extend through the clearance openings 26 in the collector plates 14, which openings are provided for insulating the rods 20 from the plates 14.

The two metal rods 27 extend through the clearance openings 28 in the end plates 10 and through the clearance openings 41 in the plates 14, and serve to support the insulated collector plates 22 from the insulators 29 which are attached by the brackets 17 to the end plates 10 as will be described. The spacers 30 which are similar to the described spacers 15 and 23, extend around the rods 27 in close contact therewith, and contact the collector plates 22 around the apertures therein through which the rods 27 extend, and provide good electrical and mechanical contact between the rods 27 and the plates 22, and serve also to space the plates 22 the correct distances apart.

The ceramic insulators 29 which have relatively small thicknesses enabling them to be completely enclosed in the spaces bounded by the flanged sides of the end plates, are disc-shaped with relatively large diameters for providing the necessary surfaces, and have the central, inner, metal bushings 31 which are threaded onto the outer ends of the rods 27. The insulators have the outer cylindrical portions 32 of reduced diameter which extend into the openings 33 in the brackets 17. The brackets 17 around the openings 33 have inwardly extending portions 34 which contact the outer, central, flattened surfaces 35 of the insulators 29. The insulators thus are supported by the brackets 17 from the end plates, and serve to support the insulated collector plates 22 from the end plates.

The cylindrical portions 32 of the insulators 29 have the mutually perpendicular, transverse slots 37 therein, across their ends. The portions 34 of the brackets 17 are drilled to receive the cotter pins 40 which are adapted to extend in the slots 37. With the cotter pins removed, the insulators 29 can be rotated to move the rods 27 along their lengths in one or the other direction depending upon the direction of rotation of the insulators. This will cause movement of the plates 22 supported on the rods 27 whereby the plates 22 can be centered between the plates 14. With the plates properly centered, the slot 37 in each insulator nearest its associated cotter pin receiving holes, is aligned therewith, and the cotter pins inserted for locking the insulators in place.

Figure 4:
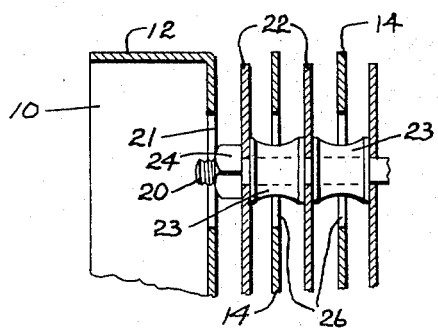
Fig. 4 is an enlarged sectional view taken along the lines 4—4 of Fig. 2.
Figure 5:
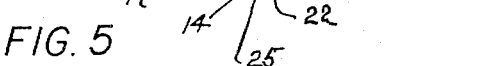
Fig. 5 is an enlarged fractional view of one of the insulator supporting brackets, and of a cotter pin held in a slot in the insulator supported by the bracket.

The spacers 15, 23 and 30 have outer surfaces which are curved in circular arcs whereby the thickness of each spacer is minimum at its longitudinal center, and maximum at its collector plate contacting ends. This provides adequate clearance around the spacers with minimum size clearance holes in the plates through which they pass without contact. Thus with reference to Fig. 4 of the drawing, it is apparent that by curving the outer surfaces of the spacers 23, the clearance holes 26 therearound in the plates 14 are smaller than would be required for adequate clearance if the spacers were cylindrical.

The insulated collector plates 22 are adapted to be connected to a high voltage, direct current terminal of the said power supply source, the voltage of which may be +6,000 volts.

As illustrated, the collector plate supporting insulators 29 are located completely out of the stream of gas to be cleaned since the gas flow would be between the inner surfaces of the end plates 10. This results in no interference by the insulators with the gas flow, and in the insulators remaining clean since no foreign particles from the gas will be deposited thereon.

Another advantage of supporting the insulators outside the end plates of the cell, is that when the collector plates are sprayed with water or other liquids as is often done, the insulators are not coated with the liquid, and do not interfere with its distribution upon the collector plates.

The insulator collector plates 22 of the cell, are shorter than the grounded collector plates 14 which extend beyond the plates 22 on all sides thereof. Thus when one cell is stacked upon another similar cell with the sides 12 of the end plates 10 in contact, the insulated plates of each cell will be spaced from contact with any portion of the other cell.

While one embodiment of the invention has been described for the purpose of illustration, it should be understood that the invention is not limited to the exact apparatus and arrangement of apparatus illustrated, as modifications thereof may be suggested by those skilled in the art, without departure from the essence of the invention.

What is claimed is:

1. A collector cell for an electrostatic precipitator comprising a plurality of spaced, parallel, collector plates, structural end plates for said cell extending substantially parallel to said plates, means for supporting alternate of said collector plates from said end plates, insulator supports attached to said end plates, said supports having portions spaced from said end plates and extending substantially parallel thereto, insulators in the spaces between said portions of said supports and said end plates, said insulators having axes extending substantially perpendicular to said end plates, means for supporting said insulators from said supports, and means for supporting the others of said collector plates from said insulators.

2. A collector cell as claimed in claim 1 in which the end plates have flanged sides extending substantially perpendicular thereto and outwardly therefrom around the space occupied by said insulators.

3. A collector cell as claimed in claim 1 in which the means for supporting the insulators from the supports, and the means for supporting the other plates from the insulators, includes means for moving the other collector plates relative the alternate plates through rotation of the insulators.

4. A collector cell for an electrostatic precipitator comprising a plurality of spaced, parallel, collector plates, structural end plates for said cell extending parallel to said collector plates, means for supporting alternate of said collector plates from said end plates, insulator supports attached to said end plates and having portions spaced therefrom and extending parallel thereto, insulators rotatably supported along their axes by said supports in the spaces between said portions of the supports and the end plates, and means including rods threaded axially into said insulators for supporting the others of said collector plates therefrom whereby upon rotation of said insulators, said other plates are moveable relative said alternate plates.

5. A collector cell for an electrostatic precipitator comprising a plurality of spaced, parallel, collector plates, structural end plates for said cell extending substantially parallel to said collector plates, means for supporting alternate of said collector plates from said end plates, insulator supports attached at their ends to said end plates, said supports having portions intermediate their ends spaced from said end plates, insulators supported from said suports in the spaces between said intermediate portions and said end plates, and means including rods supporting the others of said collector plates from said insulators, said alternate plates and said end plates having clearance openings therein through which said rods pass.

6. A collector cell as claimed in claim 5 in which the end plates have flanged sides extending substantially perpendicular thereto, outwardly around the spaces occupied by said insulators.

7. A collector cell as claimed in claim 6 in which the insulators are circular in section with relatively small thicknesses along the axes thereof, and have relatively large maximum diameters.

8. A collector cell as claimed in claim 7 in which the end plates have flanged sides extending substantially perpendicular thereto, outwardly around the spaces occupied by said insulators.

9. A collector cell for an electrostatic precipitator comprising a plurality of spaced, substantially parallel, collector plates, structural end plates for said cell extending substantially parallel to said collector plates, insulator supports on the opposite sides of said end plates from said collector plates, means including a pair of rods extending through said collector and end plates and said insulator supports for supporting alternate of said collector plates and said supports from said end plates, the others of said collector plates having clearance openings through which said rods extend, said supports having portions between said rods spaced from said end plates, insulators attached to said supports in the spaces between same and the end plates, and means for supporting the others of said collector plates from said insulators.

EARL L. RICHARDSON.

REFERENCES CITED

The following references are of record in the file of this patent:

UNITED STATES PATENTS

| Number | Name | Date |
|---|---|---|
| 1,444,512 | Luetscher | Feb. 6, 1923 |
| 1,573,376 | Dickerson et al. | Feb. 16, 1926 |
| 2,195,431 | Shively et al. | Apr. 2, 1940 |
| 2,307,603 | Penney | Jan. 5, 1943 |
| 2,470,356 | MacKenzie | May 17, 1949 |